(12) United States Patent
Kortge et al.

(10) Patent No.: US 7,597,023 B2
(45) Date of Patent: Oct. 6, 2009

(54) SHIFTER MECHANISM WITH SECONDARY DETENT

(75) Inventors: Gary Douglas Kortge, Fremont, MI (US); Robert John Reha, Nunica, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 619 days.

(21) Appl. No.: 11/252,428

(22) Filed: Oct. 17, 2005

(65) Prior Publication Data
US 2007/0137362 A1  Jun. 21, 2007

(51) Int. Cl.
G05G 5/08 (2006.01)
G05G 5/06 (2006.01)

(52) U.S. Cl. .......................... 74/473.25; 74/527; 74/531

(58) Field of Classification Search .............. 74/473.21, 74/473.24, 473.25, 473.26, 473.36, 527, 74/531; 403/348–350
See application file for complete search history.

(56) References Cited

U.S. PATENT DOCUMENTS

| | | | | |
|---|---|---|---|---|
| 3,986,780 A * | 10/1976 | Nivet | ........................ | 403/353 |
| 5,062,509 A | 11/1991 | Carpenter et al. | | |
| 5,277,078 A * | 1/1994 | Osborn et al. | ............ | 74/473.28 |
| 5,309,783 A | 5/1994 | Doolittle et al. | | |
| 5,314,049 A | 5/1994 | Nordstrom | | |
| 5,445,046 A * | 8/1995 | Kataumi et al. | ............... | 74/527 |
| 5,453,732 A * | 9/1995 | Takano | ........................ | 340/456 |
| 5,505,103 A | 4/1996 | Nordstrom et al. | | |
| 5,967,919 A * | 10/1999 | Bakker | ........................ | 474/94 |
| 6,295,886 B1 | 10/2001 | Russell | | |
| 6,382,046 B1 | 5/2002 | Wang | | |
| 6,520,043 B1 | 2/2003 | Wang | | |
| 6,732,847 B1 | 5/2004 | Wang | | |
| 6,918,314 B2 | 7/2005 | Wang | | |
| 7,270,623 B2 | 9/2007 | Wang | | |
| 7,326,148 B2 | 2/2008 | Howe et al. | | |
| 2004/0244524 A1 | 12/2004 | Russell | | |
| 2005/0223835 A1 | 10/2005 | Wang | | |

* cited by examiner

*Primary Examiner*—Thomas R Hannon
*Assistant Examiner*—James Pilkington
(74) *Attorney, Agent, or Firm*—Porter Wright Morris & Arthur LLP; Richard M. Mescher; Dean B. Watson

(57) ABSTRACT

A shifter mechanism includes a secondary detent forming a secondary detent profile having a plurality of gear positions, a shifter lever movable relative to the detent profile and a along a shift path, a lever pivotably secured to the shifter lever and engaging the detent profile as the shifter lever moves along the shift path, and a torsion spring biasing the lever into engagement with the detent profile. The illustrated lever includes a cylindrical-shaped connecting portion operatively secured to the shifter lever and an elongate arm portion extending from the connecting portion and having a free end engaging the secondary detent profile. The illustrated connecting portion is received in a cylindrically-shaped cavity formed by the shifter lever so that the lever is pivotable relative to the shifter lever and the spring extends about the connecting portion to resiliently bias the lever into engagement with the secondary detent profile.

17 Claims, 5 Drawing Sheets

SHIFTER MECHANISM WITH SECONDARY DETENT

TITLE OF THE INVENTION

SHIFTER MECHANISM WITH SECONDARY DETENT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a shifter mechanism for controlling transmissions of motor vehicles.

BACKGROUND OF THE INVENTION

In a vehicle equipped with an automatic transmission, a shifter mechanism typically includes a shifter lever pivotable over a series of positions representative of desired transmission gears such as, for example, park (P), reverse (R), neutral (N), drive (D), and low gear (M). The shifter mechanism is connected to the motor vehicle automatic transmission by a suitable mechanical and/or electronic operating linkage to effect actuation of the transmission to the selected gear when the shifter lever is pivoted to the transmission gear's representative position. The shifter mechanism is typically provided with a detent assembly which releasably holds the shifter lever in a desired position to prevent inadvertent movement of the shifter lever to other positions but to permit desired movement of the shifter lever to other positions. The detent assembly typically includes a mechanical or electrical actuator which is operated to release the detent assembly and permit manual pivoting of the shifter lever mechanism to a new position.

Shifter mechanisms also often have a secondary detent assembly that creates a centering position for the shifter lever at each position so that the shifter lever is precisely located in a desired location for the position and/or provides a desired "tactile" feel to the operator as the operator moves the shifter lever through the gear positions so that the operator can feel each position as the shifter lever is moved. While these prior secondary detent assemblies may suitably perform their intended purpose, they are complex and expensive to produce and assemble. Additionally, they are not very flexible in the sense that the load applied can not be easily adjusted. Furthermore, there is a never ending desire in the motor vehicle industry to reduce package size, weight and cost. Accordingly, there is a need in the art for an improved shifter mechanism.

SUMMARY OF THE INVENTION

The present invention provides a shifter mechanism which overcomes at least some of the above-noted problems of the related art. According to the present invention, a shifter mechanism comprises, in combination, a secondary detent forming a secondary detent profile having a plurality of gear positions, a shifter lever movable relative to the detent profile and a along a shift path, a lever pivotably secured to the shifter lever and engaging the detent profile as the shifter lever moves along the shift path, and a torsion spring resiliently biasing the lever into engagement with the detent profile.

According to another aspect of the present invention, a shifter mechanism comprises, in combination, a secondary detent forming a secondary detent profile having a plurality of gear positions, a shifter lever movable relative to the detent profile and a along a shift path, and a lever pivotably secured to the shifter lever and engaging the detent profile as the shifter lever moves along the shift path. The lever includes a cylindrical-shaped connecting portion operatively secured to the shifter lever and an elongate arm portion extending from the connecting portion and having a free end engaging the secondary detent profile. The connecting portion is received in a cylindrically-shaped cavity formed by the shifter lever so that the lever is pivotable relative to the shifter lever. The connecting portion includes a retainer axially securing the connecting portion within the cavity.

According to yet another aspect of the present invention, a shifter mechanism comprises, in combination, a secondary detent forming a secondary detent profile having a plurality of gear positions, a shifter lever movable relative to the detent profile and a along a shift path, a lever pivotably secured to the shifter lever and engaging the detent profile as the shifter lever moves along the shift path, and a torsion spring resiliently biasing the lever into engagement with the detent profile. The lever includes a cylindrical-shaped connecting portion operatively secured to the shifter lever and an elongate arm portion extending from the connecting portion and having a free end engaging the secondary detent profile. The connecting portion is received in a cylindrically-shaped cavity formed by the shifter lever so that the lever is pivotable relative to the shifter lever and the torsion spring extends about the connecting portion to resiliently bias the lever into engagement with the secondary detent profile as the shifter lever moves along the shift path.

From the foregoing disclosure and the following more detailed description of various preferred embodiments it will be apparent to those skilled in the art that the present invention provides a significant advance in the technology and art of motor vehicle shifter mechanisms. Particularly significant in this regard is the potential the invention affords for providing a high quality, reliable, low cost, easily adjusted assembly having reduced package size. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
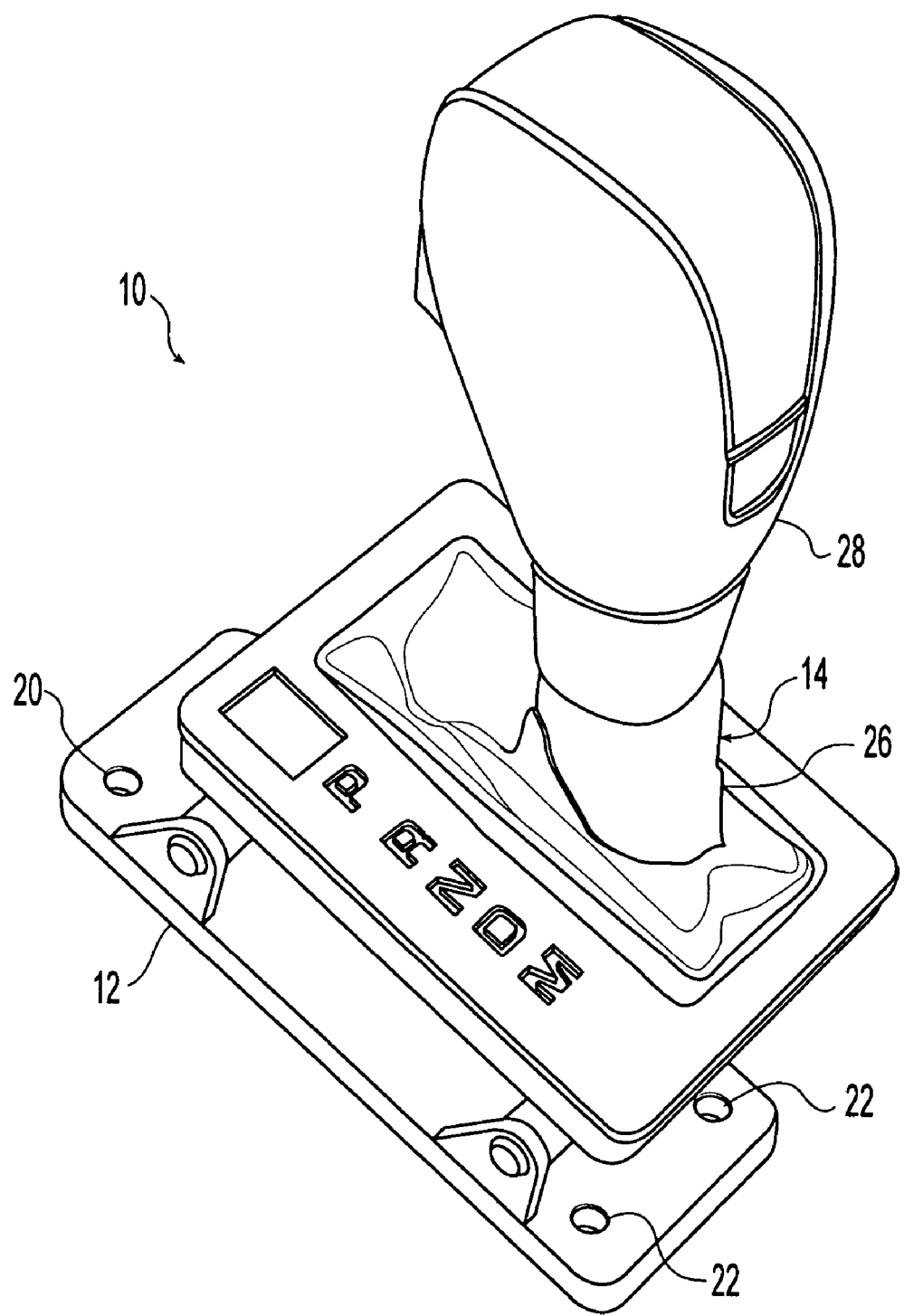
FIG. 1 is a perspective view of a shifter mechanism according to a preferred embodiment of the present invention.

It should be understood that the appended drawings are not necessarily to scale, presenting a somewhat simplified representation of various preferred features illustrative of the basic principles of the invention. The specific design features of the shifter mechanism as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter mechanism illustrated in the drawings. In general, up or upward generally refers to an upward direction in FIG. 1 and down or downward generally refers to a downward direction in FIG. 1. Also in general, fore or forward refers to a direction toward the front of the motor vehicle, that is, generally toward the left in FIG. 1 and aft or rearward refers to a direction toward the rear of the motor vehicle, that is, generally toward the right in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter mechanism disclosed herein. The following detailed discussion of various alternative and preferred embodiments will illustrate the general principles of the invention with reference to a shifter mechanism for a motor vehicle such as an automobile, sport utility vehicle (SUV), or truck. Other embodiments suitable for other applications will be apparent to those skilled in the art given the benefit of this disclosure.

Referring now to the drawings, FIGS. 1 to 4 show a shifter mechanism 10 according to a preferred embodiment of the present invention. The illustrated shifter mechanism 10 includes a frame or base 12, a shifter lever assembly 14 pivotably mounted to the base 12, a lock or primary detent assembly 16 releasably holding or locking the shifter lever assembly 14 in a desired one of a plurality of gear positions against undesired or inadvertent movement to the other gear positions, and a secondary detent assembly 18 centering the shifter lever assembly 14 at the gear positions and/or providing tactile feel to the operator when selectively moving the shifter lever assembly 14 between the plurality of gear positions.

The base 12 is adapted to be attached to the motor vehicle in a fixed position such as a floor or console and can be formed of any suitable size and shape. The illustrated base 12 is generally planar and shaped to engage the motor vehicle in a desired manner. The forward end of the illustrated base is provided with an opening or hole 20 for receiving a mechanical fastener such as bolts to secure the base 12 to the motor vehicle. The rearward end of the base 12 is provided with a pair of openings or holes 22 for receiving mechanical fasteners such as bolts to secure the base 12 to the motor vehicle. Other suitable shapes for the base 12 and the attachment means 20, 22 will be apparent to those skilled in the art.

The base 12 can be formed of any suitable material such as, for example, plastic and can be produced by any desirable method such as molding. Preferably, the base 12 is formed of unitary or one-piece construction but alternatively can be constructed of multiple components secured together.

The illustrated shifter lever assembly 14 includes a shifter yoke 24 and a shifter post or arm 26 upwardly extending from the shifter yoke 24 for manually moving the shifter yoke 24 to change the gear of the transmission. The illustrated shifter yoke 24 is pivotably secured to the base 12 such that it is pivotable about a horizontal and laterally extending pivot axis so that the shifter lever assembly 14 can pivot between the gear positions. The shifter yoke 24 is adapted for interacting with the primary detent assembly 16 to selectively release the shifter lever assembly 14 from the previous gear position and maintain the shifter lever assembly 14 in the desired gear position. The shifter yoke 24 is also adapted for interacting with the secondary detent assembly 18 for providing a desired tactile feel while moving to a desired gear position.

The shifter yoke 24 can be formed of any suitable material such as, for example, plastic and can be produced by any desirable method such as molding. Preferably, the shifter yoke 24 is formed of unitary or one-piece construction but alternatively can be constructed of multiple components secured together.

The illustrated shifter arm 26 is generally an elongate tube. The lower end of the shifter arm 26 is adapted to extend into an opening in the shifter yoke 24. The shifter arm 26 can be rigidly secured to the shifter yoke 24 in any suitable manner such as, for example, snap-connectors, welding, adhesives, or mechanical fasteners or the shifter arm 26 can be formed unitary, that is as one piece, with the shifter yoke 24. With the shifter arm 26 rigidly secured to shifter yoke 24, the shifter yoke 24 can be selectively pivoted about the lateral pivot axis by manually applying a forward or rearward force to the shifter arm 26. As best shown in FIG. 1, the upper end of the shifter arm 26 is preferably provided with handle or knob 28.

The illustrated primary detent assembly 16 includes a primary detent plate 29 forming a gate or detent profile 30. The illustrated detent plate 29 is vertically disposed with the detent profile 30 formed on a lower edge thereof. The illustrated detent profile 30 has a plurality of downward facing discontinuities in the form of grooves or notches formed therein. The grooves correspond with the various gear positions in which the shifter lever assembly 14 can be shifted to provide a desired gear at the transmission of the motor vehicle. The grooves can indicate positions such as park (P), reverse (R), neutral (N), drive (D), and low gear (M). The shifter lever assembly 14 is suitably connected, either mechanically and/or electrically, to the transmission of the motor vehicle such that movement the shifter lever assembly 14 to the various positions causes the transmission to move to the corresponding gear. The grooves are sized and shaped to cooperate with a detent lever or pawl to limit movement in a known manner, that is, to releasably hold the shifter lever assembly 14 in a desired gear position.

The secondary detent assembly 18 includes a secondary detent plate 32 fixed to the base 12 and forming a secondary detent profile 34, a detent lever 36 secured to the shifter lever assembly 14 for movement therewith and engaging the secondary detent profile 34, and a spring member 38 resiliently biasing the detent lever 36 into engagement with the secondary detent profile 34 as the shifter lever assembly 14 is moved through the gear positions.

An arcuate upper edge of the secondary detent plate 32 forms the secondary detent profile 34. The illustrated secondary detent profile 34 is an outward facing contoured surface formed by a plurality of radially outward facing discontinuities in the form of grooves or notches 40 formed therein. The grooves 40 correspond with the various gear positions in which the shifter lever assembly 14 can be shifted to provide a desired gear at the transmission of the motor vehicle. The grooves 40 can indicate positions such as park (P), reverse (R), neutral (N), drive (D), and low gear (M). The secondary detent plate 32 is fixed to the base 12 so that the grooves 40 remain stationary when the shifter yoke 24 is pivoted about the lateral pivot axis relative to the base 12 and are sized and shaped to cooperate with the detent lever 36 and spring member 38 to provide a desired tactile feel. It is noted that the grooves 40 can alternatively have other suitable shapes such as, for example, arcuate shaped or rectangular or square shaped and can each be shaped differently from one another if desired. It is also noted that the contoured surface of the secondary detent profile 34 can alternatively be formed in other manners such as, for example, spaced apart protrusions and/or can alternatively have any desired shape and size.

The illustrated detent lever 36 is pivotably secured to the shifter yoke 24 so that it moves with the shifter lever assembly 14 as the shifter lever assembly moves through the gear positions. The illustrated detent lever 36 includes a cylindrically shaped connecting portion 42 and an elongate arm portion 44 extending from the connecting portion 42. The connecting portion 42 is sized and shaped for pivotally connecting the detent lever 36 to the shifter yoke 24. The illustrated connecting portion 42 is closely received within a cylindrically-shaped cavity 46 formed in the shifter yoke 24 to form a pivoting connection with a horizontal, laterally extending pivot axis. The illustrated cavity 46 is provided with a tubular-shaped integral pivot 47 which extends into the connecting portion 42 and upon which the connecting portion 42 pivots. It is noted that the cavity 46 and the pivot 47 form an annular-shaped space within which the connecting portion 42 extends and pivots. The illustrated connecting portion 42 is also provided with a unitary retainer 48 that secures the detent lever 36 to the shifter yoke 24 without the use of separate mechanical fasteners. The illustrated retainer 48 extends from an end of the connecting portion 42 opposite the arm portion 44 and extends through a rectangular shaped opening 50 at an otherwise closed end of the cavity 46. The retainer 48 includes a pair of tabs or wings 52 that extend in opposite directions. The retainer 48 is sized and shaped so that the retainer 48 can be moved through the opening 50 when oriented to an insertion orientation but the retainer 48 cannot move through the opening 50 when oriented to an operating orientation. The detent lever 36 and the retainer 48 are oriented so that the connecting portion 42 is secured to the shifter yoke 24 in a manner limiting axial relative movement therebetween as the shifter lever assembly 14 is moved through the gear positions as described in more detail hereafter.

The illustrated arm portion 44 extends from the connecting portion 42 substantially perpendicular to the pivot axis and is located at an end of the connecting portion 42 opposite the end with the retainer 48. The illustrated arm portion 44 extends in an arc like manner from the connecting portion 42 to a free or engagement end 54 sized and shaped for engaging the secondary detent profile 34. The free end 54 is sized and shaped to closely to cooperate with the grooves 40 of the secondary detent plate 32 so that the detent lever 36 and the spring member 38 provide desired frictional resistance to the movement of the shifter lever assembly 14 when the primary detent assembly 16 is in its unlocked position.

The detent lever 36 can be formed of any suitable material such as, for example, plastic and can be produced by any desirable method such as molding. Preferably, the connecting portion 42 and the lever portion 44 are formed of unitary or one-piece construction but alternatively can be constructed of multiple components secured together.

Figure 2:
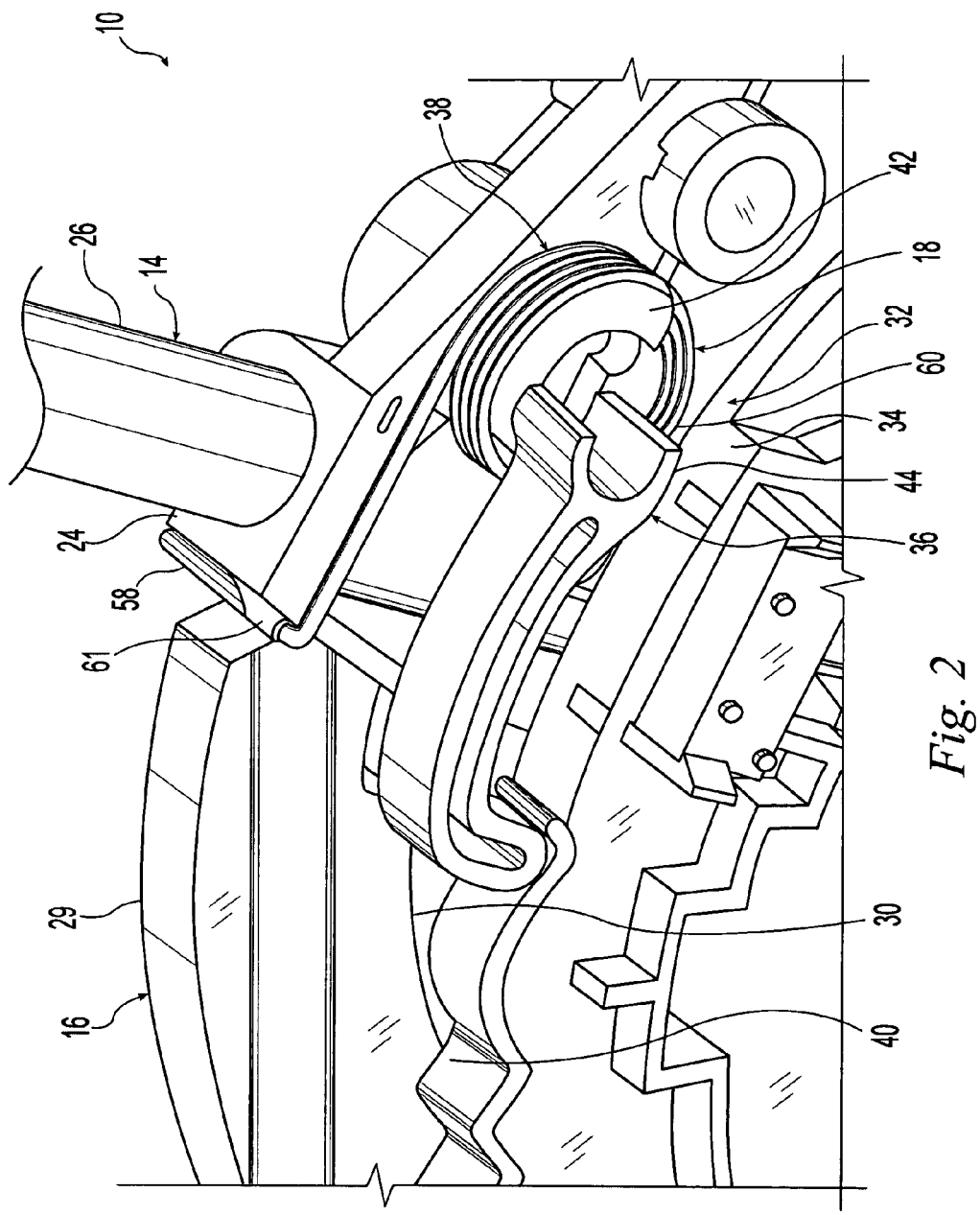
FIG. 2 is an enlarged, fragmented perspective view of the shifter mechanism of FIG. 1 showing a secondary detent assembly of the shifter mechanism with components removed for clarity.
Figure 3:
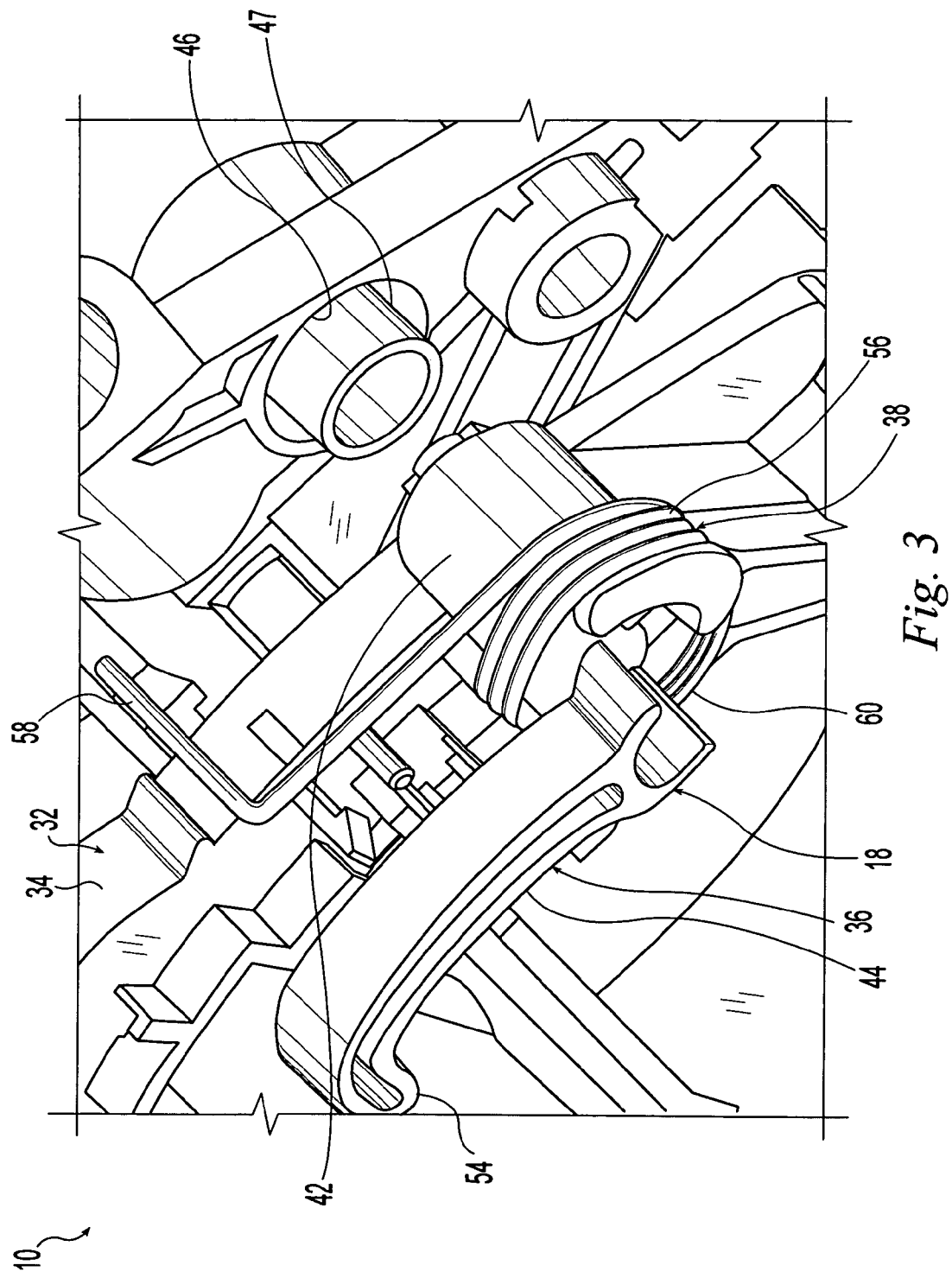
FIG. 3 is a partially-exploded perspective view of the secondary detent assembly of FIG. 2.
Figure 4:
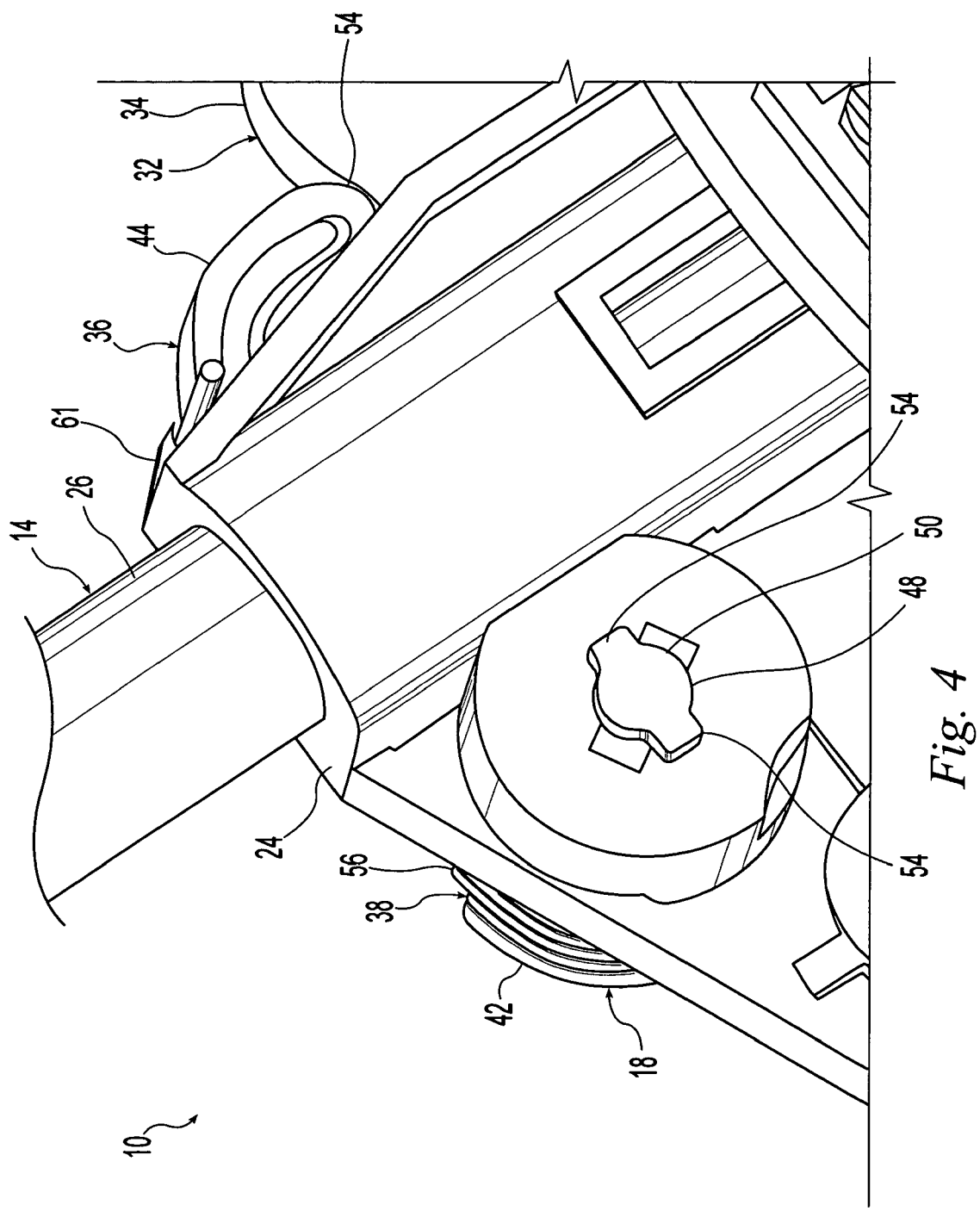
FIG. 4 is an enlarged, fragmented perspective view of the shifter mechanism of FIGS. 1 to 3 showing an opposite side of the secondary detent assembly compared to FIG. 2 with components removed for clarity.

The illustrated spring member 38 is a torsion spring having a coiled portion 56 located about the connecting portion 42 of the detent lever 36, a first leg portion 58 operatively engaging the shifter yoke 24, and a second leg portion 60 operatively engaging the detent lever 36. The illustrated first leg portion 58 is held below a flange or abutment 61 of the shifter yoke 24 that forms a reaction feature for the spring member 38. The illustrated second leg portion 60 is held above an abutment of the detent lever 36 that forms a reaction feature for the spring member 38. Secured in this manner, the spring member 38 resiliently biases the free end 54 of the detent lever 36 in a downward direction, that is a counter-clockwise direction as seen in FIG. 2, and into engagement with the secondary detent profile 34.

As the shifter yoke 24 pivots relative to the base 12, the spring member 38 resiliently maintains the engagement end 54 of the detent lever 36 in sliding contact with the secondary detent profile 34 as the engagement end 54 moves along the grooves 60. The spring member 38 resiliently flexes so that the engagement end 54 of the detent lever 36 follows the secondary detent profile 34. The secondary detent profile 34, the detent lever 36, and the spring member 38 are sized and shaped to provide a desired frictional resistance. The resistance can easily be adjusted by interchanging torsion springs providing greater or lesser loads.

Figure 5:
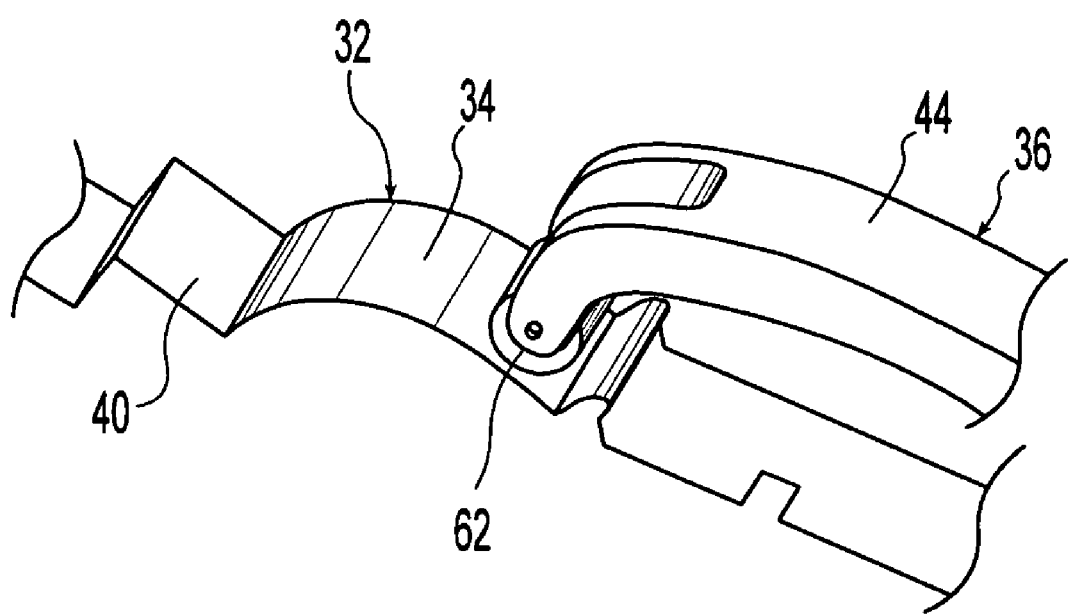
FIG. 5 is fragmented, perspective view of a shifter mechanism according to an alternative embodiment of the present invention wherein a lever of the secondary detent assembly is provided with a roller.

FIG. 5 illustrates an alternative embodiment of the present invention wherein the detent lever 36 is provided with a wheel or roller 62. The roller 62 is rotatably secured to the free end 54 of the arm portion 44 of the detent lever 36 so that the roller 62 engages the secondary detent profile. The roller 62 eliminates the sliding contact of the above described embodiment and provides rolling-contact engagement in order to reduce friction between the detent lever 36 and the secondary detent profile 34.

It is apparent from the above detailed description of preferred embodiments of the present invention, that the secondary detent assembly 18 provides a decreased package size from prior shifter mechanisms and reduces cost and complexity of manufacturing and assembly. Additionally, the secondary detent assembly 18 provides increased flexibility in making load contribution adjustments because only the spring member 38 needs to be changed. Furthermore, the secondary detent assembly 18 reduces the number of required parts because no mechanical fasteners are required.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:
1. A shifter mechanism comprising, in combination:
a detent profile having a plurality of gear positions;
a shifter lever assembly movable relative to the detent profile and along a shift path;

a detent lever pivotably secured to the shifter lever assembly and engaging the detent profile as the shifter lever assembly moves along the shift path;

wherein the detent lever includes a cylindrical-shaped connecting portion operatively secured to the shifter lever assembly and an elongate arm portion extending from the connecting portion and having a free end engaging the detent profile;

wherein the shifter lever assembly forms a cylindrically shaped cavity and a tubular-shaped pivot coaxial with and located within the cavity to form an annular-shaped space therebetween;

wherein the tubular-shaped pivot extends into and engages the connecting portion so that the connecting portion pivots upon the tubular shaped pivot and the detent lever is pivotable relative to the shifter lever assembly;

wherein the detent lever includes a retainer to axially secure the connecting portion within the cavity as the shifter lever assembly is moved through the gear positions;

wherein the connecting portion, the lever portion, and the retainer are molded as a unitary one-piece component; and a torsion spring including a coiled portion located about the connecting portion of the detent lever, and operatively engaging the shifter lever assembly and the detent lever so that the torsion spring resiliently biases the free end of the elongate arm portion of the detent lever into engagement with the detent profile.

2. The shifter mechanism according to claim 1, wherein the detent profile includes a plurality of discontinuities.

3. The shifter mechanism according to claim 1, wherein the detent lever is in sliding-contact engagement with the detent profile.

4. The shifter mechanism according to claim 1, wherein the detent lever has a roller in rolling-contact engagement with the detent profile.

5. The shifter mechanism according to claim 1, wherein the retainer extends axially through the connection portion and beyond an end of the connection portion so that the retainer axially extends entirely through the tubular-shaped pivot and through an opening in an otherwise closed end of the tubular-shaped pivot to axially secure the connecting portion within the cavity.

6. The shifter mechanism according to claim 1, wherein the retainer includes a pair of tabs sized and shaped to extend through an opening in an otherwise closed end of the tubular-shaped pivot when oriented in an insertion orientation but cannot move through the opening when oriented to an operating orientation and the tabs and the arm portion are oriented so that detent lever is secured to the shifter lever assembly as the shifter lever assembly is moved through the gear positions.

7. The shifter mechanism according to claim 1, wherein annular-shaped space is closed at an axial end located opposite the arm portion of the detent lever.

8. The shifter mechanism according to claim 1, wherein the connection portion, the lever portion and the retainer pivot in unison relative to the shifter lever assembly.

9. The shifter mechanism according to claim 1, wherein the pivot extends out of and beyond an open axial end of the cavity.

10. A shifter mechanism comprising, in combination:
a detent profile having a plurality of gear positions;
a shifter lever assembly movable relative to the detent profile and along a shift path;
a detent lever pivotably secured to the shifter lever assembly and engaging the detent profile as the shifter lever assembly moves along the shift path;

wherein the detent lever includes a cylindrical-shaped connecting portion operatively secured to the shifter lever assembly and an elongate arm portion extending from the connecting portion and having a free end engaging the detent profile;

wherein the shifter lever assembly forms a cylindrically shaped cavity and a tubular-shaped pivot coaxial with and located within the cavity to form an annular shaped space therebetween;

wherein the tubular-shaped pivot extends into and engages the connecting portion so that the connecting portion pivots upon the tubular-shaped pivot within the cavity and the detent lever is pivotable relative to the shifter lever assembly;

wherein the detent lever includes a unitary retainer coaxially extending through the connection portion and beyond an end of the connection portion so that the retainer axially extends entirely through the tubular-shaped pivot and through an opening in an otherwise closed end of the tubular-shaped pivot to axially secure the connecting portion within the cavity;

wherein the retainer includes a pair of tabs sized and shaped to extend through the opening when oriented in an insertion orientation but cannot move through the opening when oriented to an operating orientation and the tabs and the arm portion are oriented so that detent lever is secured to the shifter lever assembly as the shifter lever assembly is moved through the gear positions; and a torsion spring including a coiled portion located about the connecting portion of the detent lever, and operatively engaging the shifter lever assembly and the detent lever so that the torsion spring resiliently biases the free end of the elongate arm portion of the detent lever into engagement with the detent profile.

11. The shifter mechanism according to claim 10, wherein the detent profile includes a plurality of discontinuities.

12. The shifter mechanism according to claim 10, wherein the detent lever is in sliding-contact engagement with the detent profile.

13. The shifter mechanism according to claim 10, wherein the detent lever has a roller in rolling-contact engagement with the detent profile.

14. The shifter mechanism according to claim 10, wherein the connection portion, the lever portion and the retainer pivot in unison relative to the shifter lever assembly.

15. The shifter mechanism according to claim 10, wherein the pivot extends out of and beyond an open axial end of the cavity.

16. A shifter mechanism comprising, in combination:
a detent profile having a plurality of gear positions;
a shifter lever assembly movable relative to the detent profile and along a shift path;
a detent lever pivotably secured to the shifter lever assembly and engaging the detent profile as the shifter lever assembly moves along the shift path;

wherein the detent lever includes a cylindrical-shaped connecting portion operatively secured to the shifter lever assembly and an elongate arm portion extending from the connecting portion and having a free end engaging the detent profile;

wherein the shifter lever assembly forms a cylindrically shaped cavity and a tubular-shaped pivot coaxial with and located within the cavity to form an annular-shaped space therebetween;

wherein the tubular-shaped pivot extends into and engages the connecting portion so that the connecting portion pivots upon the tubular shaped pivot and the detent lever is pivotable relative to the shifter lever assembly;

wherein the detent lever includes a unitary retainer coaxially extending through the connection portion and beyond an end of the connection portion so that the retainer axially extends entirely through the tubular-shaped pivot and through an opening in an otherwise closed end of the tubular-shaped pivot to axially secure the connecting portion within the cavity;

wherein the retainer includes a pair of tabs sized and shaped to extend through the opening when oriented in an insertion orientation but cannot move through the opening when oriented to an operating orientation and the tabs and the arm portion are oriented so that detent lever is secured to the shifter lever assembly as the shifter lever assembly is moved through the gear positions;

wherein the connecting portion, the lever portion, and the retainer are molded as a unitary one-piece component and pivot in unison relative to the shifter lever assembly; and a torsion spring including a coiled portion located about the connecting portion of the detent lever, and operatively engaging the shifter lever assembly and the detent lever so that the torsion spring resiliently biases the free end of the elongate arm portion of the detent lever into engagement with the detent profile.

17. The shifter mechanism according to claim 16, wherein the pivot extends out of and beyond an open axial end of the cavity.

* * * * *